United States Patent
Dai et al.

(10) Patent No.: US 11,169,367 B2
(45) Date of Patent: Nov. 9, 2021

(54) THREE-DIMENSIONAL MICROSCOPIC IMAGING METHOD AND SYSTEM

(71) Applicant: TSINGHUA UNIVERSITY, Beijing (CN)

(72) Inventors: Qionghai Dai, Beijing (CN); Zhi Lu, Beijing (CN); Jiamin Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 35 days.

(21) Appl. No.: 16/357,811

(22) Filed: Mar. 19, 2019

(65) Prior Publication Data
US 2020/0241276 A1    Jul. 30, 2020

(30) Foreign Application Priority Data

Jan. 29, 2019    (CN) .......................... 201910085758.2

(51) Int. Cl.
H04N 13/204    (2018.01)
G02B 21/36    (2006.01)
G02B 21/22    (2006.01)

(52) U.S. Cl.
CPC .......... *G02B 21/367* (2013.01); *G02B 21/22* (2013.01); *H04N 13/204* (2018.05)

(58) Field of Classification Search
CPC ..... G02B 21/367; G02B 21/22; H04N 13/204
See application file for complete search history.

(56) References Cited

U.S. PATENT DOCUMENTS

| 2017/0045521 A1* | 2/2017 | Vinegoni ........... G02B 21/0096 |
| 2019/0213717 A1* | 7/2019 | Oniki ........................ G06T 5/20 |
| 2019/0333254 A1* | 10/2019 | Lyu ............................ G06T 7/11 |

FOREIGN PATENT DOCUMENTS

| CN | 107091825 A | * | 8/2017 |
| CN | 107091825 A |   | 8/2017 |
| CN | 109270678 A | * | 1/2019 |
| CN | 109270678 A |   | 1/2019 |

OTHER PUBLICATIONS

First Office Action dated May 11, 2020 for Chinese Application No. 201910085758.2.
English translation of First Office Action dated May 11, 2020 for Chinese Application No. 201910085758.2.

* cited by examiner

*Primary Examiner* — Hesham K Abouzahra
(74) *Attorney, Agent, or Firm* — David D. Brush; Westman, Champlin & Koehler, P.A.

(57) ABSTRACT

Provided are a 3D microscopic imaging method and a 3D microscopic imaging system. The method includes: acquiring a first PSF of a 3D sample from an object plane to a plane of a main camera sensor and a second PSF of the 3D sample from the object plane to a plane of a secondary camera sensor, and generating a first forward projection matrix corresponding to the first PSF and a second forward projection matrix corresponding to the second PSF; acquiring a light field image captured by the main camera sensor and a high resolution image captured by the secondary camera sensor; generating a reconstruction result of the 3D sample by reconstructing the light field image, the first forward projection matrix, the high resolution image and the second forward projection matrix according to a preset algorithm.

11 Claims, 2 Drawing Sheets

--- acquiring a first PSF of a 3D sample from an object plane to a plane of a main camera sensor and a second PSF of the 3D sample from the object plane to a plane of a secondary camera sensor, and generating a first forward projection matrix corresponding to the first PSF and a second forward projection matrix corresponding to the second PSF — S101 acquiring a light field image captured by the main camera sensor and a high resolution image captured by the secondary camera sensor — S102 generating a reconstruction result of the 3D sample by reconstructing the light field image, the first forward projection matrix, the high resolution image and the second forward projection matrix according to a preset algorithm — S103

(a) focal-plane true image (b) focal-plane reconstruction image of traditional light field (c) focal-plane reconstruction image of the present disclosure

THREE-DIMENSIONAL MICROSCOPIC IMAGING METHOD AND SYSTEM

CROSS-REFERENCE TO RELATED APPLICATION

This application claims priority to and benefits of Chinese Patent Application Serial No. 201910085758.2, filed with the State Intellectual Property Office of P. R. China on Jan. 29, 2019, the entire content of which is incorporated herein by reference.

FIELD

The present disclosure relates to a computational photography field, and more particularly to a 3D microscopic imaging system and a 3D microscopic imaging method.

BACKGROUND

In the traditional microscopy technique, an image of a three-dimensional (3D) sample is a two-dimensional image showing information of a certain plane of the 3D sample. In order to obtain the information of a 3D structure of the sample, a canning method may be applied. However, it costs a certain period of time for scanning a biological sample, and a scanning speed may be lower than a dynamic change speed of a biological sample, and thus the scanning method is limited in the biological sample imaging applications.

Special attentions have been paid to the light field imaging method due to its rapid capture of multi-dimensional information. When collecting the light field image, the information of different angles is integrated into one image, which greatly sacrifices the horizontal resolution of the image, and the image interference due to different angles may have negative influence on the reconstruction result of the image.

Therefore, a microscopic imaging method and a microscopic imaging system, which are able to provide a clear and accurate image showing the 3D structure of the biological sample, are still needed in the art.

SUMMARY

Embodiments of the present disclosure seek to solve at least one of the problems existing in the related art to at least some extent.

Accordingly, embodiments of a first aspect of the present disclosure provide a 3D microscopic imaging method, including:

acquiring a first point spread function (PSF) of a 3D sample from an object plane to a plane of a main camera sensor and a second PSF of the 3D sample from the object plane to a plane of a secondary camera sensor, and generating a first forward projection matrix corresponding to the first PSF and a second forward projection matrix corresponding to the second PSF;

acquiring a light field image captured by the main camera sensor and a high resolution image captured by the secondary camera sensor;

generating a reconstruction result of the 3D sample by reconstructing the light field image, the first forward projection matrix, the high resolution image and the second forward projection matrix according to a preset algorithm.

Embodiments of a second aspect of the present disclosure provide a 3D microscopic imaging system including: a microscope, a light splitter, a main camera sensor, a secondary camera sensor, a micro lens array, and a controller, in which the microscope includes a laser source, a translation stage, a dichroscope, an objective lens and a tube lens, the secondary camera sensor is arranged at a first side of the light splitter and located at a first microscope image plane, the light splitter, the micro lens array and the main camera sensor are arranged in line, the micro lens array is arranged at a second side of the light splitter and located at a second microscope image plane, the main camera sensor is located at a focal plane of the micro lens array, and the main camera sensor and the secondary camera sensor are connected to the controller through data lines.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
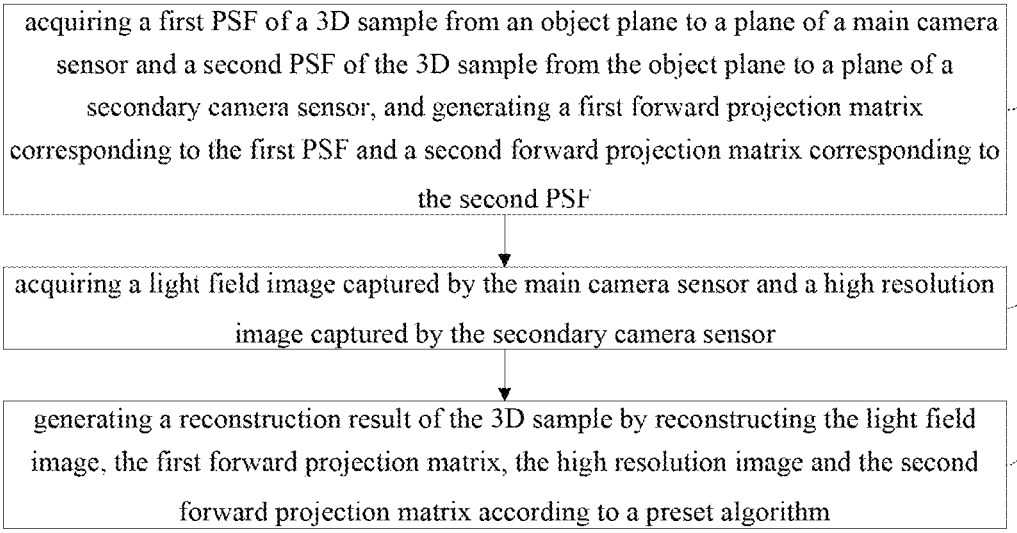
FIG. 1 is a flow chart of a 3D microscopic imaging method according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, and used to generally understand the present disclosure. The embodiments shall not be construed to limit the present disclosure.

The light field microscopy is a rapid three-dimensional microscopic technique collecting spatial information and angular information at the same time, thus acquiring four-dimensional optical field information including two-dimensional spatial information and two-dimensional angle information during one collection. Specifically, a micro lens array with a compact structure is arranged at the image plane of the microscope system, so as to perform a multi-channel imaging simultaneously to obtain a light field image. Images obtained from different angles of illumination correspond to information of different positions of the sample in the Fourier domain, i.e., correspond to different spatial positions of a single lens in the micro lens array. A low-resolution image of the illumination having a certain incident angle may be obtained by recording pixels of the corresponding position in the light field image. The low-resolution image may be reconstructed into a 3D image according to a Richardson-Lucy (RL) algorithm, an algorithm for super-resolution image restoration.

A 3D microscopic imaging method and system according to embodiments of the present disclosure will be described below with reference to the accompanying drawings.

FIG. 1 is a flow chart of a 3D microscopic imaging method according to an embodiment of the present disclosure.

As shown in FIG. 1, the 3D microscopic imaging method includes following steps.

In S101, a first PSF of a 3D sample from an object plane to a plane of a main camera sensor and a second PSF of the 3D sample from the object plane to a plane of a secondary camera sensor are acquired, and a first forward projection matrix corresponding to the first PSF and a second forward projection matrix corresponding to the second PSF are generated.

In an embodiment of the present disclosure, S101 further includes: calculating the second PSF of the 3D sample from the object plane to a plane where a micro lens array is located, acquiring the first PSF by multiplying the second PSF by a transmission coefficient of the micro lens array, squaring a modulus of the first PSF and performing a discretization process to acquire the first forward projection matrix and squaring a modulus of the second PSF and performing the discretization process to acquire the second forward projection matrix.

Specifically, the $PSF_2$ of the 3D sample from the object plane to the micro lens array plane is calculated. The $PSF_2$ is multiplied by the transmission coefficient of the micro lens array to acquire the $PSF_1$ of the 3D optical system. A modulo operation is performed on the $PSF_1$ and the $PSF_2$, the modulus of the $PSF_1$ and the $PSF_2$ are squared and then discretized to acquire the first forward projection matrix $H_1$ and the second forward projection matrix $H_2$.

In S102, a light field image captured by the main camera sensor and a high resolution image captured by the secondary camera sensor are acquired.

In an embodiment of the present disclosure, S102 further includes: focusing on a plane of the 3D sample; dividing a light beam from a tube lens into a first part of the light beam and a second part of the light beam by a light splitter downstream of the tube lens; recording the high resolution image by using the secondary camera sensor to collect the first part of the light beam; recording the light field image of a 3D scene of the 3D sample in each viewing direction by using the main camera sensor to collect the second part of the light beam.

Specifically, the 3D sample is placed on a translation stage of a microscope, and the microscope focuses on a plane to be imaged (e.g., a middle plane) of the 3D sample. The light splitter is placed downstream of the tube lens and configured to divide the light beam from the tube lens into two parts, and one part is collected by the secondary camera sensor. The secondary camera sensor is located at the back focal plane of the tube lens and the high resolution image, which also refers to a wide field image, is recorded as $f_2$. The light splitter is placed downstream of the tube lens and located at the back focal plane of the tube lens. The main camera sensor is located at a focal plane of the micro lens array, and is configured to record a basic image of a 3D scene of the 3D sample in each viewing direction by collecting the other part of the light beam, the light field image is acquired as $f_1$ at the same time.

In S103, a reconstruction result of the 3D sample is generated by reconstructing the light field image, the first forward projection matrix, the high resolution image and the second forward projection matrix according to a preset algorithm.

In an embodiment of the present disclosure, in S103, the preset algorithm is an iterative algorithm, including:
acquiring a 3D matrix $g^0$ of the 3D sample with a uniformly distributed grayscale;
performing an iteration process for a preset number of times, the iteration process including:
performing a light field reconstruction according to a formula of $$g_{new}^{(k)} = \mathrm{diag}(H_1^T 1)^{-1} \, \mathrm{diag}(H_1^T \, \mathrm{diag}(H_1 g^{(k)})^{-1} f_1) g^{(k)},$$

performing a high resolution wide field reconstruction according to a formula of $$g^{(k+1)} = \mathrm{diag}(H_2^T 1)^{-1} \, \mathrm{diag}(H_2^T \, \mathrm{diag}(H_2 g_{new}^{(k)})^{-1} f_2) g_{new}^{(k)},$$

where $f_1$ represents the light field image and $f_2$ represents the high resolution image, $H_1$ represents the first forward projection matrix and $H_2$ represents the second forward projection matrix.

It should be understood that other symbols in above formulas relate to calculations of the images and are known in the art. For example, $H_1^T$ represents a back projection matrix corresponding to the first forward projection matrix $H_1$, and $H_1^T 1$ refers to a calculation of an image from a back projection of a 3D matrix 1 with a uniformly distributed grayscale, diag( ) represents a diagonalization, and $g^{(k)}$ represents the sample g of the $k^{th}$ iteration.

It should be noted that the digitalized images $f_1$ and $f_2$ collected by the cameras are also matrixes and thus can be calculated in the formulas.

Specifically, the iteration process may be repeated for 300 times.

Figure 2:
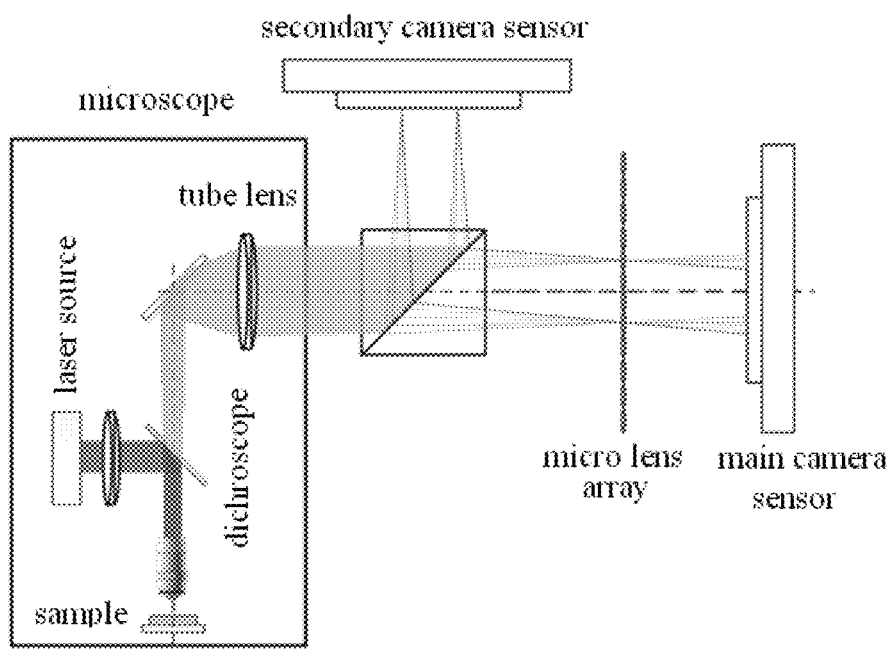
FIG. 2 is a schematic diagram showing a 3D microscopic imaging system according to an embodiment of the present disclosure.

With reference to FIG. 2, a 3D microscopic imaging system of the present disclosure is described below.

As shown in FIG. 2, the 3D microscopic imaging system includes a microscope, a light splitter, a main camera sensor, a secondary camera sensor, a micro lens array, and a controller. The microscope includes a laser source, a translation stage, a dichroscope, an objective lens and a tube lens. The secondary camera sensor is arranged at a first side of the light splitter and located at a first microscope image plane. The light splitter, the micro lens array and the main camera sensor are arranged in line. The micro lens array is arranged at a second side of the light splitter and located at a second microscope image plane. The main camera sensor is located at a focal plane of the micro lens array. The main camera sensor and the secondary camera sensor are connected to the controller through data lines.

It should be noted that the system shown in the FIG. 2 is only illustrated, and some optical elements commonly used, like the spectral filter, are omitted for simplicity.

In an embodiment of the present disclosure, a 3D sample is placed on the translation stage of the microscope, and the microscope focuses on a plane of the 3D sample.

In an embodiment of the present disclosure, the light splitter is placed downstream of the tube lens and configured to divide a light beam from the tube lens into a first part of the light beam and a second part of the light beam.

In an embodiment of the present disclosure, the first part of the light beam is collected by the secondary camera sensor and the second part of the light beam is collected by the main camera sensor.

In an embodiment of the present disclosure, an optical path from the tube lens to the secondary camera sensor is equal to an optical path from the tube lens to a back focal plane of the tube lens.

In an embodiment of the present disclosure, an optical path from the tube lens to the micro lens array is equal to an optical path from the tube lens to the back focal plane of the tube lens.

In an embodiment of the present disclosure, the main camera sensor is configured to collect the second part of the light beam to acquire a light field image.

In an embodiment of the present disclosure, the secondary camera sensor is configured to collect the first part of the light beam to acquire a high resolution image.

In an embodiment of the present disclosure, the controller is configured to:

acquire a first PSF of a 3D sample from an object plane to a plane of the main camera sensor and a second PSF of the 3D sample from the object plane to a plane of the secondary camera sensor, and generate a first forward projection matrix corresponding to the first PSF and a second forward projection matrix corresponding to the second PSF; and calculate a reconstruction result of the 3D sample according to a preset algorithm.

In an embodiment of the present disclosure, the controller acquires a first PSF of a 3D sample from an object plane to a plane of the main camera sensor and a second PSF of the 3D sample from the object plane to a plane of the secondary camera sensor, and generates a first forward projection matrix corresponding to the first PSF and a second forward projection matrix corresponding to the second PSF by:

calculating the second PSF of the 3D sample from the object plane to a plane where a micro lens array is located, acquiring the first PSF by multiplying the second PSF by a transmission coefficient of the micro lens array, squaring a modulus of the first PSF and performing a discretization process to acquire the first forward projection matrix and squaring a modulus of the second PSF and performing the discretization process to acquire the second forward projection matrix.

In an embodiment of the present disclosure, the preset algorithm is an iterative algorithm, including:

acquiring a 3D matrix $g^0$ the 3D sample with a uniformly distributed grayscale;

performing an iteration process for a preset number of times, the iteration process including:

performing a light field reconstruction according to a formula of $$g_{new}^{(k)} = \mathrm{diag}(H_1^T 1)^{-1} \, \mathrm{diag}(H_1^T \, \mathrm{diag}(H_1 g^{(k)})^{-1} f_1) g^{(k)},$$

performing a high resolution wide field reconstruction according to a formula of $$g^{(k+1)} = \mathrm{diag}(H_2^T 1)^{-1} \, \mathrm{diag}(H_2^T \, \mathrm{diag}(H_2 g_{new}^{(k)})^{-1} f_2) g_{new}^{(k)},$$

where $f_1$ represents the light field image and $f_2$ represents the high resolution image, $H_1$ represents the first forward projection matrix and $H_2$ represents the second forward projection matrix.

With the 3D microscopic imaging system according to embodiments of the present disclosure, by adding the light splitter in front of the micro lens array, another light path is added on the basis of the light field imaging. The added light path is used to capture the high resolution image of the sample at the focal panel. A controller, e.g., a general computer, is used for processing the data. On this basis, compared to an imaging system without the added light path, with the same number of iterations, the 3D microscopic imaging system of the present disclosure has a higher resolution and an improved signal to noise ratio (SNR).

Figure 3:
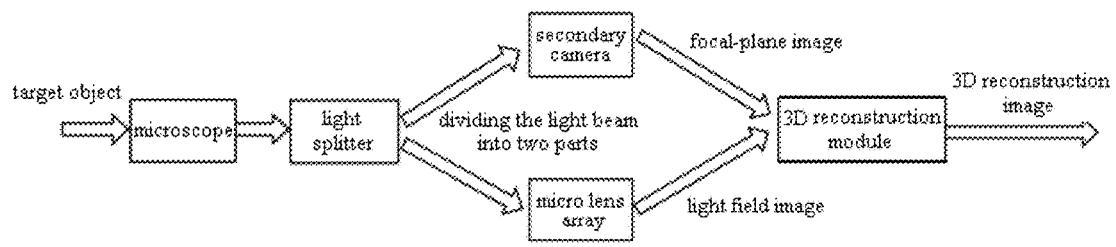
FIG. 3 is a block diagram of a 3D microscopic imaging method according to an embodiment of the present disclosure.

FIG. 3 is a block diagram of a 3D microscopic imaging method according to an embodiment of the present disclosure.

Specifically, an optical system is constructed.

The $PSF_1$ from the object plane to the main camera sensor plane in the optical system is calculated and is discretized to acquire the first forward projection matrix $H_1$. The $PSF_2$ from the object plane to the secondary camera sensor plane in the optical system is calculated and is discretized to acquire the second forward projection matrix $H_2$.

The light field image is captured by the main camera sensor as $f_1$ and the high resolution image is captured by the secondary camera sensor as $f_2$.

Moreover, $f_1$ corresponds to $H_1$, and $f_2$ corresponds to $H_2$. The 3D reconstruction is achieved according to the RL algorithm. In one iteration process, the light field image and the high resolution wide field image are reconstructed respectively. The reconstruction result can be acquired by the computer.

With the 3D microscopic imaging method according to embodiments of the present disclosure, by adding the light splitter in front of the micro lens array, another light path is added on the basis of the light field imaging. The added light path is used to capture the high resolution image of the sample at the focal panel. On this basis, compared to an imaging system without the added light path, with the same number of iterations, the 3D microscopic imaging system of the present disclosure has a higher resolution and an improved signal to noise ratio (SNR).

Figure 4:
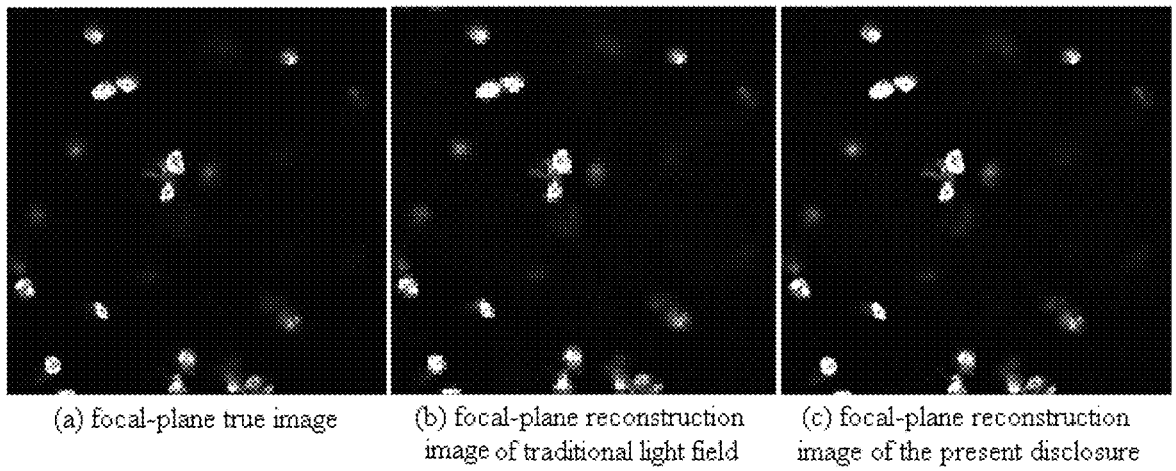
FIG. 4 shows a resolution comparison of (a) a focal-plane true image, (b) a focal-plane reconstruction image of a traditional light field and (c) a focal-plane reconstruction image according to an embodiment of the present disclosure.
Figure 5:
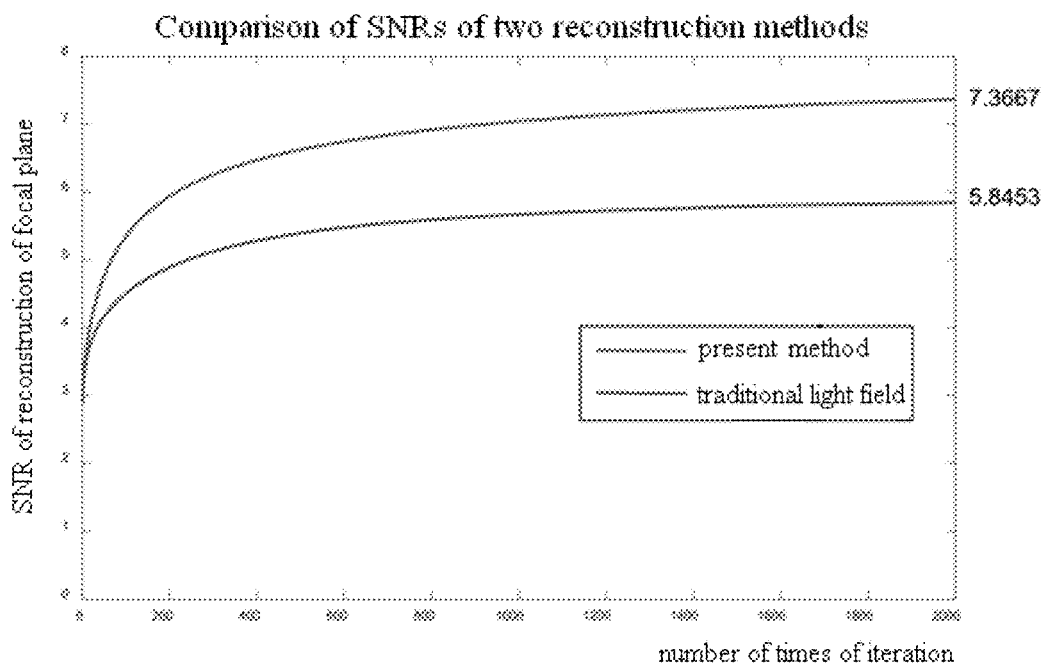
FIG. 5 is a graph showing SNRs obtained from a traditional light field microscopy method and a 3D microscopic imaging system according to an embodiment of the present disclosure.

Embodiments of the present disclosure are further described with references to FIGS. 4 and 5. The same sample is used in a light field imaging system of a single light path and in the 3D microscopic imaging system of the present disclosure and SNR is used for evaluating the reconstruction performance of each system. As shown in FIG. 5, after the iteration process is performed for 300 times for the reconstruction, the focal resolution of the 3D microscopic imaging system of the present disclosure is obviously higher than the traditional system, and is very close to the truth-value. As shown in FIG. 5, the SNR of the reconstructed image are improved gradually during repeating the steps according to the RL algorithm. Moreover, compared with the traditional system, the SNR of the reconstructed image of the present disclosure is significantly improved by more than 25% at the same iteration number. With the 3D microscopic imaging method, high resolution information is additionally acquired, and further used together with the light field information to reconstruct the image of the 3D sample.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, unless specified otherwise, "a plurality of" means two or more than two.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "a schematic embodiment", "an example", "a specific example" or "some examples" means that a particular feature, structure, material, or characteristic described in connection with the embodiment or example is included in at least one embodiment or example of the present disclosure. Thus, the appearances of the phrases such as "an embodiment", "some embodiments", "a schematic embodiment", "an example", "a specific example" or "some examples" in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A 3D microscopic imaging method, comprising:
acquiring a first Point Spread Function (PSF) of a 3D sample from an object plane to a plane of a main camera sensor and a second PSF of the 3D sample from the object plane to a plane of a secondary camera sensor, and generating a first forward projection matrix corresponding to the first PSF and a second forward projection matrix corresponding to the second PSF;
acquiring a light field image captured by the main camera sensor and a high resolution image captured by the secondary camera sensor; and
generating a reconstruction result of the 3D sample by reconstructing the light field image, the first forward projection matrix, the high resolution image and the second forward projection matrix according to a preset algorithm, wherein the preset algorithm is an iterative algorithm, comprising:
acquiring an initial matrix $g^0$ of the 3D sample with a uniformly distributed grayscale;
performing an iteration process for a preset number of times, the iteration process comprising:
performing a light field reconstruction according to a formula of $$g_{new}^{(k)} = \mathrm{diag}(H_1^T 1)^{-1}\, \mathrm{diag}(H_1^T\, \mathrm{diag}(H_1 g^{(k)})^{-1} f_1) g^{(k)},$$

and performing a high resolution reconstruction according to a formula of $$g^{(k+1)} = \mathrm{diag}(H_2^T 1)^{-1}\, \mathrm{diag}(H_2^T\, \mathrm{diag}(H_2 g_{new}^{(k)})^{-1} f_2) g_{new}^{(k)},$$

where $f_1$ represents the light field image and $f_2$ represents the high resolution image, $H_1$ represents the first forward projection matrix and $H_2$ represents the second forward projection matrix.

2. The method according to claim 1, wherein acquiring a first PSF of a 3D sample from an object plane to a plane of a main camera sensor and a second PSF of the 3D sample from the object plane to a plane of a secondary camera sensor, and generating a first forward projection matrix corresponding to the first PSF and a second forward projection matrix corresponding to the second PSF comprises:
calculating the second PSF of the 3D sample from the object plane to a plane where a micro lens array is located,
acquiring the first PSF by multiplying the second PSF by a transmission coefficient of the micro lens array,
squaring a modulus of the first PSF and performing a discretization process to acquire the first forward projection matrix and squaring a modulus of the second PSF and performing the discretization process to acquire the second forward projection matrix.

3. The method according to claim 1, wherein acquiring a light field image captured by the main camera sensor and a high resolution image captured by the secondary camera sensor comprises:
focusing on a plane of the 3D sample;
dividing a light beam from a tube lens into a first part of the light beam and a second part of the light beam by a light splitter downstream of the tube lens;
recording the high resolution image by using the secondary camera sensor to collect the first part of the light beam;
recording the light field image of a 3D scene of the 3D sample in each viewing direction by using the main camera sensor to collect the second part of the light beam.

4. A 3D microscopic imaging system, comprising:
a microscope,
a light splitter,
a main camera sensor,
a secondary camera sensor,
a micro lens array, and
a controller, wherein
the microscope comprises a laser source, a translation stage, a dichroscope, an objective lens and a tube lens,
the secondary camera sensor is arranged at a first side of the light splitter and located at a first microscope image plane,
the light splitter, the micro lens array and the main camera sensor are arranged in line,
the micro lens array is arranged at a second side of the light splitter and located at a second microscope image plane,
the main camera sensor is located at a focal plane of the micro lens array,
the main camera sensor and the secondary camera sensor are connected to the controller through data lines, and
the controller is configured to:
acquire a first Point Spread Function (PSF) of a 3D sample from an object plane to a plane of the main camera sensor and a second PSF of the 3D sample from the object plane to a plane of the secondary camera sensor, and generate a first forward projection matrix corresponding to the first PSF and a second forward projection matrix corresponding to the second PSF;

acquire a light field image captured by the main camera sensor and a high resolution image captured by the secondary camera sensor; and generate a reconstruction result of the 3D sample by reconstructing the light field image, the first forward projection matrix, the high resolution image and the second forward projection matrix according to a preset algorithm.

5. The system according to claim 4, wherein the 3D sample is placed on the translation stage of the microscope, and the microscope focuses on a plane of the 3D sample.

6. The system according to claim 4, wherein the light splitter is placed downstream of the tube lens and configured to divide a light beam from the tube lens into a first part of the light beam and a second part of the light beam.

7. The system according to claim 6, wherein the first part of the light beam is collected by the secondary camera sensor and the second part of the light beam is collected by the main camera sensor.

8. The system according to claim 4, wherein the main camera sensor is configured to collect the second part of the light beam to acquire the light field image.

9. The system according to claim 4, wherein the secondary camera sensor is configured to collect the first part of the light beam to acquire the high resolution image.

10. The system according to claim 4, wherein the controller acquires the first PSF of the 3D sample from the object plane to the plane of the main camera sensor and the second PSF of the 3D sample from the object plane to the plane of the secondary camera sensor, and generates the first forward projection matrix corresponding to the first PSF and the second forward projection matrix corresponding to the second PSF by:

calculating the second PSF of the 3D sample from the object plane to a plane where a micro lens array is located, acquiring the first PSF by multiplying the second PSF by a transmission coefficient of the micro lens array, squaring a modulus of the first PSF and performing a discretization process to acquire the first forward projection matrix and squaring a modulus of the second PSF and performing the discretization process to acquire the second forward projection matrix.

11. The system according to claim 4, wherein the preset algorithm is an iterative algorithm, comprising:

acquiring a 3D matrix $g^0$ of the 3D sample with a uniformly distributed grayscale;

performing an iteration process for a preset number of times, the iteration process comprising:

performing a light field reconstruction according to a formula of PS $$g_{new}^{(k)} = \mathrm{diag}(H_1^T 1)^{-1} \, \mathrm{diag}(H_1^T \, \mathrm{diag}(H_1 g^{(k)})^{-1} f_1) g^{(k)},$$

performing a high resolution reconstruction according to a formula of $$g^{(k+1)} = \mathrm{diag}(H_2^T 1)^{-1} \, \mathrm{diag}(H_2^T \, \mathrm{diag}(H_2 g_{new}^{(k)})^{-1} f_2) g_{new}^{(k)},$$

where $f_1$ represents the light field image and $f_2$ represents the high resolution image, $H_1$ represents the first forward projection matrix and $H_2$ represents the second forward projection matrix.

* * * * *